United States Patent
Yamamoto et al.

(10) Patent No.: US 10,084,190 B2
(45) Date of Patent: Sep. 25, 2018

(54) LITHIUM SECONDARY BATTERY AND CONDUCTIVE ASSISTANT USED IN SAME

(71) Applicant: SHOWA DENKO K. K., Tokyo (JP)

(72) Inventors: Ryuji Yamamoto, Tokyo (JP); Tsuyoshi Inose, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 43 days.

(21) Appl. No.: 15/111,300

(22) PCT Filed: Jan. 14, 2015

(86) PCT No.: PCT/JP2015/050750
§ 371 (c)(1),
(2) Date: Jul. 13, 2016

(87) PCT Pub. No.: WO2015/108056
PCT Pub. Date: Jul. 23, 2015

(65) Prior Publication Data
US 2016/0344034 A1 Nov. 24, 2016

(30) Foreign Application Priority Data
Jan. 14, 2014 (JP) .................................. 2014-004194

(51) Int. Cl.
*H01M 4/62* (2006.01)
*H01M 10/052* (2010.01)
(Continued)

(52) U.S. Cl.
CPC ........... *H01M 4/625* (2013.01); *H01M 4/624* (2013.01); *H01M 4/626* (2013.01);
(Continued)

(58) Field of Classification Search
CPC ............. H01M 4/625; H01M 10/0568; H01M 10/0569; H01M 10/0567; H01M 4/624;
(Continued)

(56) References Cited

U.S. PATENT DOCUMENTS 5,714,277 A    2/1998  Kawakami
8,597,835 B2  12/2013  Kawasaki et al.
(Continued)

FOREIGN PATENT DOCUMENTS

EP    1 061 040 A1    12/2000
EP    2682517 A2      1/2014
(Continued)

OTHER PUBLICATIONS

International Search Report of PCT/JP2015/050750 dated Apr. 7, 2015.
(Continued)

*Primary Examiner* — Stewart A Fraser
(74) *Attorney, Agent, or Firm* — Sughrue Mion, PLLC (57) ABSTRACT

A lithium secondary battery, including: a hydrofluoric acid-containing electrolytic solution; an electrode; and a conductive assistant, in which the conductive assistant (1) contains a substance that is poorly soluble in the hydrofluoric acid-containing electrolytic solution, the substance including one or more kinds selected from transition metal compounds, and (2) contains a substance that is soluble in the hydrofluoric acid-containing electrolytic solution, the substance having a total metal mass of 0 mass % or more and 0.003 mass % or less with respect to a total mass of the electrode; and a conductive assistant, including: a substance that is poorly soluble in a hydrofluoric acid-containing electrolytic solution; and a substance that consumes hydrofluoric acid, the conductive assistant being substantially free, or including 1 mass % or less with respect to a total mass thereof, of a substance that is soluble in the hydrofluoric acid-containing electrolytic solution.

9 Claims, 3 Drawing Sheets

(51) Int. Cl.
*H01M 10/0525* (2010.01)
*H01M 10/0567* (2010.01)
*H01M 10/0568* (2010.01)
*H01M 10/0569* (2010.01)

(52) U.S. Cl.
CPC ..... *H01M 10/052* (2013.01); *H01M 10/0525* (2013.01); *H01M 10/0567* (2013.01); *H01M 10/0568* (2013.01); *H01M 10/0569* (2013.01); *H01M 2220/30* (2013.01); *H01M 2300/0025* (2013.01)

(58) Field of Classification Search
CPC ............. H01M 10/0525; H01M 4/626; H01M 10/052; H01M 2300/0025; H01M 2220/30
See application file for complete search history.

(56) References Cited

U.S. PATENT DOCUMENTS

| | | | |
|---|---|---|---|
| 9,786,947 B2* | 10/2017 | Yushin | H01M 10/0525 |
| 2005/0079119 A1 | 4/2005 | Kawakami et al. | |
| 2011/0101265 A1 | 5/2011 | Kambara et al. | |
| 2012/0202112 A1* | 8/2012 | Yushin | H01M 4/38 |
| | | | 429/200 |
| 2013/0171526 A1 | 7/2013 | Miki et al. | |
| 2015/0132647 A1* | 5/2015 | Kato | H01M 4/62 |
| | | | 429/217 |

FOREIGN PATENT DOCUMENTS

| | | |
|---|---|---|
| JP | 6-283206 A | 10/1994 |
| JP | 8-060446 A | 3/1996 |
| JP | 10-214640 A | 8/1998 |
| JP | 2001-026410 A | 1/2001 |
| JP | 2004-152662 A | 5/2004 |
| JP | 2008-243414 A | 10/2008 |
| JP | 2009-295405 A | 12/2009 |
| JP | 2010-001173 A | 1/2010 |
| JP | 2010-173889 A | 8/2010 |
| JP | 2011-034919 A | 2/2011 |
| JP | 2011-063458 A | 3/2011 |
| JP | 2011-108522 A | 6/2011 |
| JP | 2012-169217 A | 9/2012 |
| JP | 2013-191458 A | 9/2013 |
| JP | 2013-243107 A | 12/2013 |
| KR | 10-0596291 B1 | 7/2006 |
| KR | 10-2008-0049157 A | 6/2008 |
| KR | 10-1225941 B1 | 1/2013 |
| WO | 2013/036405 A1 | 3/2013 |

OTHER PUBLICATIONS

Communication dated Jul. 27, 2017, issued by the Korean Intellectual Property Office in corresponding Korean Application No. 10-2016-7018736.
Communication dated Jun. 19, 2017, from the European Patent Office in counterpart European application No. 15737855.5.
Communication dated Mar. 2, 2018 from the European Patent Office in counterpart application No. 15 737 855.5.

* cited by examiner

LITHIUM SECONDARY BATTERY AND CONDUCTIVE ASSISTANT USED IN SAME

CROSS REFERENCE TO RELATED APPLICATIONS

This application is a National Stage of International Application No. PCT/JP2015/050750filed Jan. 14, 2015, claiming priority based on Japanese Patent Application No. 2014-004194filed Jan. 14, 2014, the contents of all of which are incorporated herein by reference in their entirety.

TECHNICAL FIELD

The present invention relates to a lithium secondary battery and a conductive assistant to be used in the same.

BACKGROUND ART

A lithium secondary battery has high energy density per volume or mass by virtue of characteristics of its constituent materials, as compared to a nickel-cadmium battery, a nickel-hydrogen battery, or the like. Accordingly, the lithium secondary battery enables extraction of a large amount of energy from a small battery. In addition, the battery has a high voltage of about 3.7 V, and hence can provide a large amount of power.

Therefore, the lithium secondary battery is currently in wide use as a power source for, for example, a mobile phone, a smartphone, a tablet PC, or a notebook PC.

Characteristics required of the lithium secondary battery include safety, long life, and low price.

PRIOR ART

Patent Documents

[Patent Document 1] JP 08-060446 A
[Patent Document 2] JP 2001-026410 A (EP 1061040 A1)
[Patent Document 3] JP 2011-108522 A (U.S. Pat. No. 8,597,835 B2)

SUMMARY OF INVENTION

Problem to be Solved by Invention

For the purpose of improving the safety and life of a lithium secondary battery, improvements have been made to an electrode material, a separator, and the like. Meanwhile, as a method of improving a conductive assistant so as not to adversely affect an electrochemical reaction between the positive and negative electrodes of the lithium secondary battery, there are given, for example, (1) the removal of an impurity by heat treatment at high temperature, (2) the removal of an impurity by acid washing, and (3) the dilution of an impurity by mixing with a high-purity substance.

In (1) the heat treatment at high temperature (a high temperature of 2,800° C. or more), a lot of work is required because the conductive assistant needs to be loaded into a crucible or molded, and after the heat treatment, the conductive assistant needs to be recovered from the crucible or the molded body needs to be disintegrated. In addition, this method entails a huge increase in treatment cost due to, for example, the wear of a constituent member of a high-temperature heat treatment furnace by vaporization, and the use of a high-purity inert gas that does not react with carbon (Patent Document 1).

In (2) the removal of an impurity by acid washing, the conductive assistant needs to be poured into a washing liquid. In general, as the particle diameter of the conductive assistant becomes finer, the viscosity of its dispersion liquid increases. Therefore, when a conductive assistant in the form of fine particles is used, the solid content in the liquid cannot be increased. The solid content during the acid washing generally has an upper limit of about 5 mass %. In addition to the poor efficiency of the acid washing as just described, after the acid washing, a large number of steps of, for example, concentrating the solid content by a filter, replacing the acid contained in the concentrate with water, drying the concentrate, and disintegrating the dried product need to be carried out, and hence huge treatment cost is required (Patent Document 2).

In (3) the mixing with a high-purity substance, for example, when carbon black is synthesized, an ethanol slurry containing carbon nanotubes is sprayed, and fibrous carbon and the carbon black are bound to each other to provide a carbon black composite having an ash content of 1.0 mass % or less. However, the carbon nanotubes are fibrous, and hence are liable to form a hairball-like aggregate. Accordingly, a dispersed slurry is not easily obtained. In addition, it is difficult to uniformly spray the carbon nanotubes into a reaction furnace, and hence products are liable to be nonuniform, including one in which the carbon nanotubes and the carbon black are bound to each other and one in which carbon nanotubes and carbon black are not bound to each other (Patent Document 3).

Means to Solve Problem

The inventors of the present invention have made extensive investigations on the electrochemical reaction between the positive and negative electrodes of a lithium secondary battery, and as a result, have ascertained that hydrofluoric acid contained in a trace amount in an electrolytic solution causes the dissolution of an electrode constituent substance.

Specifically, the inventors have investigated the elution behaviors of various impurities by adding the impurities to electrodes with combined use of electrolytic solutions containing different supporting electrolytes. As a result, the inventors have found that when an electrolytic solution containing no hydrofluoric acid in the electrolytic solution, such as an electrolytic solution obtained by dissolving lithium perchlorate in an organic solvent, is used, the dissolution of the impurities does not occur, and when an electrolytic solution containing hydrofluoric acid in the electrolytic solution, such as an electrolytic solution obtained by dissolving lithium hexafluorophosphate ($LiPF_6$) in an organic solvent, is used, the dissolution of the impurities is promoted.

Currently, the electrolytic solution obtained by dissolving $LiPF_6$ in an organic solvent is in wide use. The reasons for the wide use include: high ion dissociation ability; excellent oxidation resistance; the promotion of the formation of a solid electrolyte interface (SEI) film on the surface of the negative electrode; and the formation of a passive film on the surface of an aluminum foil serving as a positive current collector.

$LiPF_6$ is liable to react with water (moisture in the air), thereby producing hydrofluoric acid. Therefore, the electrolytic solution obtained by dissolving $LiPF_6$ in an organic solvent contains a trace amount of hydrofluoric acid (which functions as a weak acid when its concentration is dilute).

That is, it has been found that a major factor in causing the dissolution of the impurities is not an electrochemical reaction, but is chemical dissolution due to the hydrofluoric acid contained in the electrolytic solution.

From the foregoing, it has been revealed that when a substance is poorly soluble in the hydrofluoric acid contained in the electrolytic solution, the presence of the substance in an electrode has extremely little influence on safety or life.

In addition, it has also been revealed that it is also effective to add, to the conductive assistant, a substance capable of consuming the hydrofluoric acid in the electrolytic solution by reacting with the hydrofluoric acid and moisture in the electrolytic solution to form a stable complex and neutralize the hydrofluoric acid.

The present invention includes the following configurations as embodiments thereof.

[1] A lithium secondary battery, comprising:
a hydrofluoric acid-containing electrolytic solution;
an electrode; and
a conductive assistant,
in which the conductive assistant
(1) contains a substance that is poorly soluble in the hydrofluoric acid-containing electrolytic solution, the substance comprising one or more kinds selected from the group consisting of transition metal compounds, and
(2) contains a substance that is soluble in the hydrofluoric acid-containing electrolytic solution, the substance having a total metal mass of 0 mass % or more and 0.003 mass % or less with respect to a total mass of the electrode.

[2] A lithium secondary battery, comprising:
a hydrofluoric acid-containing electrolytic solution;
an electrode; and
a conductive assistant,
in which the conductive assistant
(1) contains a substance that is poorly soluble in the hydrofluoric acid-containing electrolytic solution, the substance comprising one or more kinds selected from the group consisting of transition metal compounds, and
(2) is substantially free of a substance that is soluble in the hydrofluoric acid-containing electrolytic solution.

[3] The lithium secondary battery according to [1] or [2] above, in which the substance that is poorly soluble in the hydrofluoric acid-containing electrolytic solution is at least one kind selected from the group consisting of iron(II) oxide, iron(III) oxide, and triiron carbide.

[4] The lithium secondary battery according to any one of [1] to [3] above, in which the conductive assistant contains a carbon material as a main component.

[5] The lithium secondary battery according to any one of [1] to [4] above, in which the conductive assistant contains a fibrous carbon material.

[6] The lithium secondary battery according to any one of [1] to [5] above, in which the conductive assistant further contains a substance that consumes hydrofluoric acid.

[7] The lithium secondary battery according to [6] above, in which the substance that consumes hydrofluoric acid is a metal oxide.

[8] The lithium secondary battery according to [6] above, in which the substance that consumes hydrofluoric acid is intermediate alumina.

[9] The lithium secondary battery according to any one of [6] to [8] above, in which the substance that consumes hydrofluoric acid has a mass of 0.06 mass % or more and 0.3 mass % or less of a total mass of the electrode.

[10] The lithium secondary battery according to any one of [1] to [9] above,
in which the conductive assistant comprises metal-encapsulating carbon nanotubes, and
in which the substance that is poorly soluble in the hydrofluoric acid-containing electrolytic solution is present outside the carbon nanotubes.

[11] A conductive assistant, comprising:
a substance that is poorly soluble in a hydrofluoric acid-containing electrolytic solution; and
a substance that consumes hydrofluoric acid,
the conductive assistant being substantially free, or including 1 mass % or less with respect to a total mass thereof, of a substance that is soluble in the hydrofluoric acid-containing electrolytic solution.

[12] The conductive assistant according to [11] above, in which a content of the substance that consumes hydrofluoric acid is 2 mass % or more and 20 mass % or less with respect to a total mass of the conductive assistant.

[13] A fibrous carbon material, comprising:
a substance that is poorly soluble in a hydrofluoric acid-containing electrolytic solution; and
a substance that consumes hydrofluoric acid,
the fibrous carbon material being substantially free, or including 1 mass % or less with respect to a total mass thereof, of a substance that is soluble in the hydrofluoric acid-containing electrolytic solution.

[14] A screening method for an electrode additive, comprising:
adding each of various additives to an electrode;
analyzing elution behavior of each of the additives in an electrolytic solution containing hydrofluoric acid; and
classifying the additives into an additive that is poorly soluble in the hydrofluoric acid contained in the electrolytic solution and an additive that is soluble in the hydrofluoric acid contained in the electrolytic solution.

Advantageous Effects of Invention

Through the use of the conductive assistant according to one embodiment of the present invention, the life of a lithium secondary battery can be increased.

MODE FOR CARRYING OUT INVENTION

One or more kinds of substances that are poorly soluble in a hydrofluoric acid-containing electrolytic solution, the substances being selected from the group consisting of transition metal compounds, each refer to the following substance: when electrochemical elution measurement is performed using a cell formed of a working electrode containing the transition metal compound, an electrolytic solution containing about 30 ppm by mass of hydrofluoric acid, a separator, and a lithium metal counter electrode at an ambient temperature of 25° C. for 24 hours, the mass of the metal to be precipitated on the counter electrode is 5 mass % or less of the total mass of the metal contained in the transition metal compound contained in the working electrode.

Now, an example of an electrochemical elution measurement method and an example of measurement results are described.

(Production Method for Working Electrode)

0.04 g of a transition metal, a transition metal oxide, or a transition metal carbide (the mass of the metal contained therein is represented by W1), 1.56 g of carbon black (manufactured by Timcal Graphite & Carbon, trade name: C45) (the mass of the carbon black contained in a working electrode is represented by W2), and 0.4 g of polytetrafluoroethylene (PTFE) are weighed out.

The weighed-out transition metal, transition metal oxide, or transition metal carbide, and carbon black are put into an agate mortar, and the powders are uniformly mixed using a pestle. The PTFE is further put into the agate mortar, and the contents are vigorously mixed so as to stretch the PTFE. Thus, a rubbery composite is obtained.

The resultant rubbery composite is sandwiched between plates made of Teflon (trademark), and is compressed at a pressure of 5 MPa using a hydraulic uniaxial press. The compressed rubbery composite is divided with scissors made of ceramics into four parts, and the parts are laminated. The resultant is again sandwiched between plates made of Teflon (trademark), and is compressed using a hydraulic uniaxial press. The compression/folding/compression operation is performed 4 times to uniformly disperse the components in the rubbery composite.

The compressed rubbery composite is cut into a predetermined size (20 mm×20 mm×0.5 mmt) with scissors made of ceramics, and is pressure-bonded onto an aluminum mesh (20 mm×20 mm×0.03 mmt) having welded thereon an aluminum tab lead using a hydraulic uniaxial press at a pressure of 15 MPa. Thus, a working electrode is produced.

As a reference, a working electrode being free of the transition metal, the transition metal oxide, or the transition metal carbide and being formed of 1.6 g of the carbon black (the mass of the carbon black contained in the working electrode for reference is represented by W3) and 0.4 g of the PTFE is similarly produced.

(Assembly Method for Cell for Evaluation)

The production of a cell, the disassembly of the cell, and the dissolution of the disassembled counter electrode in ethanol are performed under a dry argon atmosphere having a dew point of −80° C. or less.

Figure 1:
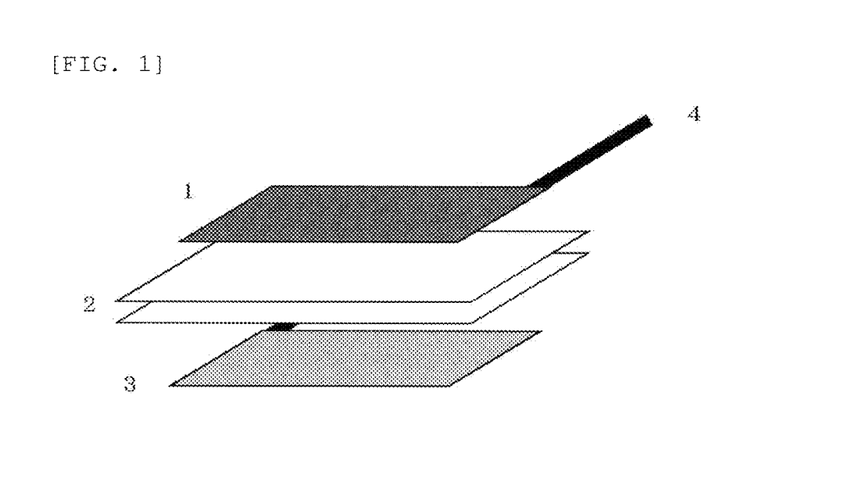
FIG. 1 is a schematic view of a laminate used for a cell for evaluation.

FIG. 1 is a schematic view of a laminate used for a cell for evaluation. The rubbery composite serving as a working electrode 1 is laminated with a lithium metal foil 3 having pressure-bonded thereonto a copper mesh (serving as a counter electrode and also serving as a reference electrode: manufactured by Honjo Metal Co., Ltd., 22 mm×22 mm×0.05 mmt: its mass has already been measured) through the intermediation of two separators 2 (Celgard #2400 manufactured by Celgard, 30 mm×50 mm×0.025 mmt) sandwiched therebetween.

The laminate is inserted between aluminum laminate materials that have been heat-sealed on two sides, and the resultant is heat-sealed on the side from which a tab lead 4 extends. An electrolytic solution is injected into the cell for evaluation that has been heat-sealed on the three sides, followed by vacuum heat-sealing. Thus, a cell for evaluation is produced.

The electrolytic solution to be used is one obtained by dissolving $LiPF_6$ at 1.0 mol/L in an organic solvent obtained by mixing ethylene carbonate and ethyl methyl carbonate at a volume ratio of 3:7.

In this case, the electrolytic solution contains about 30 ppm by mass of hydrofluoric acid. The content of the hydrofluoric acid may be measured from a value obtained as follows: the electrolytic solution is diluted to an appropriate concentration depending on a measurement apparatus, the dilution is measured for its fluoride ion concentration with an ion chromatographic analyzer, and the measured value is multiplied by the dilution factor.

(Electrochemical Elution Test)

The cell for evaluation is connected to a potentio/galvanostat (manufactured by BioLogic Science instruments), and a voltage of 4.3 V with respect to the reference electrode is applied to the working electrode. After that, this state is kept until the current value sufficiently attenuates (24 hours). The metal species contained in the working electrode dissolves in the electrolytic solution, diffuses in the electrolytic solution through the application of the voltage, and is reduced on the lithium metal foil serving as the counter electrode to be precipitated as a metal.

After the completion of the measurement, the cell for evaluation is disassembled with scissors made of ceramics to remove the counter electrode (lithium metal foil), and the counter electrode is immersed in a plastic container containing ethanol and dissolved at room temperature.

The whole amount of the ethanol solution in the plastic container is transferred to a beaker made of PTFE, the beaker made of PTFE is placed on a hot plate and heated at about 150° C. for 4 hours to evaporate the contents to dryness. After the contents have been dried, the beaker made of PTFE is cooled to room temperature.

To the precipitate in the beaker made of PTFE, 2 mL of nitric acid (nitric acid obtained by adding an equal volume of water to concentrated nitric acid) is added dropwise with a pipette. The beaker made of PTFE is placed on a hot plate and heated at about 150° C. for 10 minutes to dissolve the precipitate.

The contents in the beaker made of PTFE are washed into a 50 mL plastic container with ultrapure water, and the volume of the contents is adjusted to 50 mL with ultrapure water.

The solution is analyzed with an ICP emission spectrometer (Vista-PRO manufactured by SII NanoTechnology Inc.) to measure the mass W4 of the metal contained in the liquid.

In addition, similarly, also for metal elution from carbon black, an electrochemical elution test is performed, and analysis is performed with an ICP emission spectrometer to measure the mass W5 of the metal contained in the liquid.

A metal elution ratio from the carbon black is calculated using the equation (1).

Metal elution ratio (derived from carbon black) (%)={(W5/W3)}×100    Equation (1)

A metal elution ratio from the transition metal, the transition metal oxide, or the transition metal carbide is calculated using the equation (2).

Metal elution ratio (%)=(W4−W2×metal elution ratio (derived from carbon black)/100)/W1×100    Equation (2)

Examples of substances used for the evaluation are given below.

Figure 2:
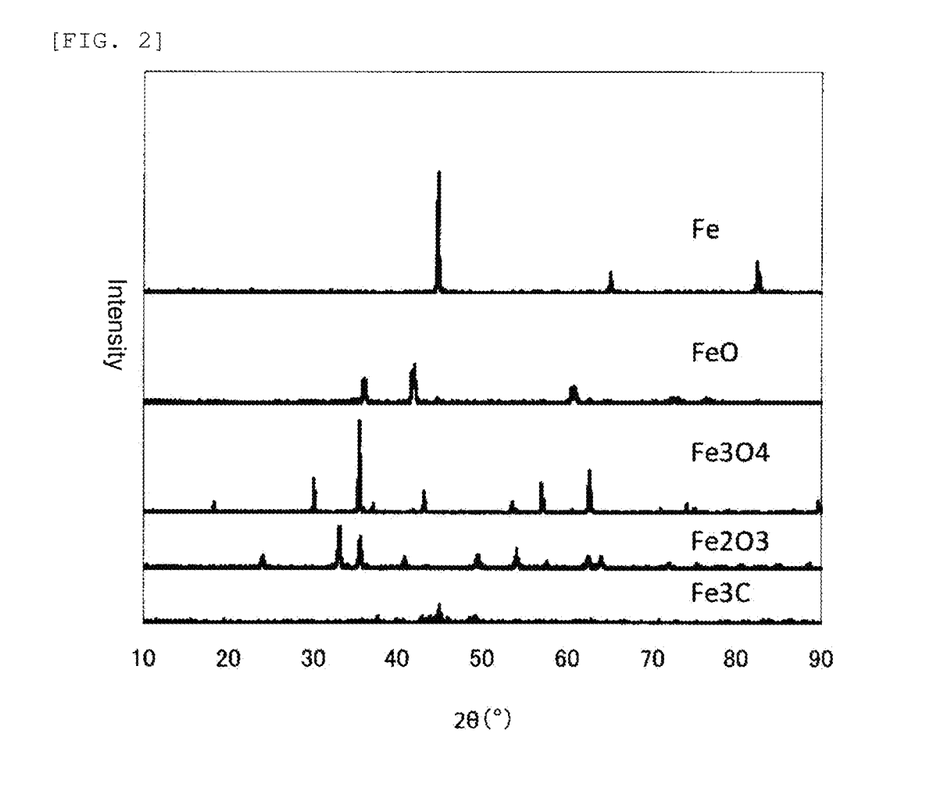
FIG. 2 is an example of X-ray diffraction patterns of iron-based substances.
Figure 3:
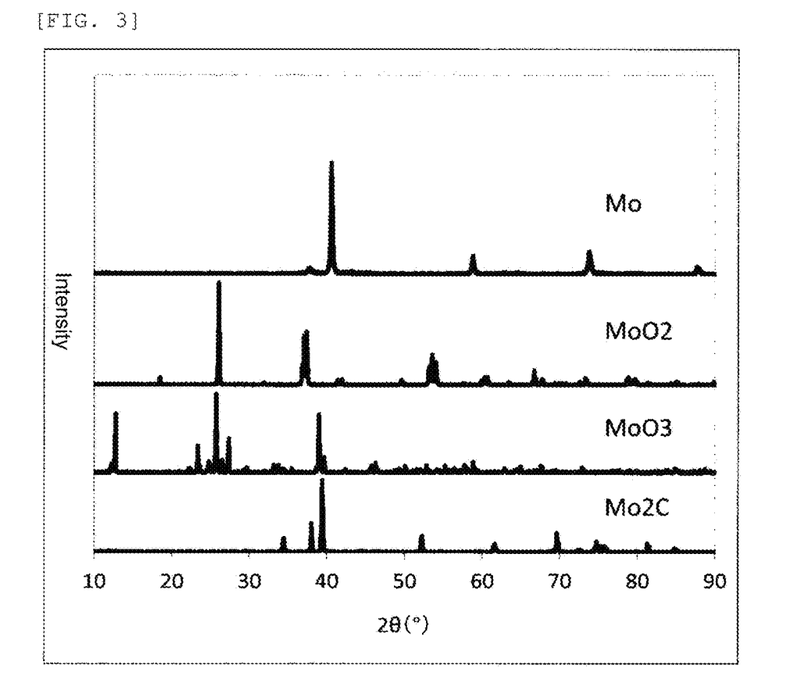
FIG. 3 is an example of X-ray diffraction patterns of molybdenum-based substances.

X-ray diffraction patterns of iron (Fe), iron(II) oxide (FeO), iron(II,III) oxide ($Fe_3O_4$), iron(III) oxide ($Fe_2O_3$), and triiron carbide ($Fe_3C$) are shown in FIG. 2, and X-ray diffraction patterns of molybdenum (Mo), molybdenum dioxide ($MoO_2$), molybdenum trioxide ($MoO_3$), and molybdenum carbide ($Mo_2C$) are shown in FIG. 3. X-ray diffraction was performed using a powder X-ray diffractometer Ultima IV manufactured by Rigaku Corporation (X-ray source: CuKα (40 kV-30 mA), scanning rate: 2°/min.).

The electrochemical metal elution test results of the transition metal, the transition metal oxide, or the transition metal carbide are shown in Table 1. A substance having a metal elution ratio calculated by the equation (2) of 5 mass % or less was determined as "poorly soluble". The poorly soluble substance of the present invention is not limited to the substances shown in Table 1. Any substance may be used without any limitation as long as the substance is poorly soluble in a hydrofluoric acid-containing electrolytic solution.

TABLE 1

| Sample No. | Substance of interest | Mass of substance of interest contained in working electrode (g) | Mass of metal contained in substance of interest (g) | (Mass of metal precipitated on counter electrode)/(mass of metal contained in working electrode) (mass %) | Classification |
|---|---|---|---|---|---|
| 1 | $Fe_3C$ | 0.040 | 0.037 | 3.7 | Poorly soluble |
| 2 | $Fe_2O_3$ | 0.040 | 0.028 | 1.6 | Poorly soluble |
| 3 | $Fe_3O_4$ | 0.040 | 0.029 | 0.1 | Poorly soluble |
| 4 | FeO | 0.040 | 0.031 | 1.2 | Poorly soluble |
| 5 | Fe | 0.040 | 0.040 | 29.5 | Soluble |
| 6 | $Mo_2C$ | 0.040 | 0.038 | 0.8 | Poorly soluble |
| 7 | $MoO_3$ | 0.040 | 0.027 | 0.9 | Poorly soluble |
| 8 | $MoO_2$ | 0.040 | 0.030 | 26.1 | Soluble |
| 9 | Mo | 0.040 | 0.040 | 6.8 | Soluble |

$Fe_3C$, $Fe_2O_3$, $Fe_3O_4$, FeO, $Mo_2C$, or $MoO_3$ may be classified as a poorly soluble transition metal compound because, in this case, the mass of the metal to be precipitated on the counter electrode is 5 mass % or less of the mass of the metal contained in the transition metal compound contained in the working electrode.

Meanwhile, Fe, $MoO_2$, or Mo is classified as a soluble transition metal or a soluble transition metal compound because the mass of the metal to be precipitated on the counter electrode is more than 5 mass % of the mass of the transition metal, or the metal contained in the transition metal compound, contained in the working electrode.

When the transition metal compound is poorly soluble in a hydrofluoric acid-containing electrolytic solution, its presence on the outer surface of a conductive assistant does not affect the performance of a battery. When a large amount of the conductive assistant needs to be incorporated into an electrode, it is more effective to adopt such a substance that the mass of the metal to be precipitated on the counter electrode is 2 mass % or less of the mass of the metal contained in the transition metal compound contained in the working electrode. In addition, a further improvement in performance can be expected to be achieved through further incorporation of a substance that consumes hydrofluoric acid as described later.

In an electrode, a substance containing a metal that is soluble in a hydrofluoric acid-containing electrolytic solution may also be present, but the mass of the metal (the mass of the metal in the substance containing the transition metal) is preferably 0.003 mass % or less (including 0) with respect to the mass of the electrode. The case where the mass of the metal is substantially 0 is more preferred. When the mass of the metal is more than 0.003 mass %, there is a high risk in that the precipitation of the metal on a negative electrode affects an electrochemical reaction between a positive electrode and the negative electrode.

Herein, the term "soluble" in the substance containing the soluble metal means not being "poorly soluble" as described above (including insoluble).

The conductive assistant preferably contains a substance that is poorly soluble in a hydrofluoric acid-containing electrolytic solution, and a substance that consumes hydrofluoric acid. The preferred content of the substance that is soluble in a hydrofluoric acid-containing electrolytic solution depends on the kind of the metal in the substance, and hence cannot be specified in a generalized manner. In general, however, the content is set to preferably 0 mass % or more and 1 mass % or less, more preferably 0 mass % or more and 0.5 mass % or less with respect to the mass of the conductive assistant, and it is still more preferred that the conductive assistant be substantially free of such substance. However, a substance that is completely encapsulated in the conductive assistant is not eluted into the electrolytic solution, and hence the conductive assistant may be used without any problem even when containing more than 1 mass % of such substance.

The conductive assistant preferably contains a carbon material as a main component, and from the viewpoint of forming a conductive network through the addition of a small amount of the conductive assistant, the carbon material is preferably a fibrous carbon material.

The fibrous carbon material is preferably carbon nanotubes having a number average fiber diameter of 10 nm or more and 50 nm or less, and a number average fiber length of 1 μm or more and 10 μm or less.

The carbon nanotubes may be used in combination with a graphite material, such as natural graphite or artificial graphite, or a carbon material in the form of fine particles bound in a row, e.g., carbon black, such as acetylene black, furnace black, channel black, or thermal black.

The substance that consumes hydrofluoric acid is preferably fine particles of aluminum oxide, magnesium oxide, or zinc oxide, more preferably intermediate alumina, still more preferably any one of γ-alumina, δ-alumina, χ-alumina, κ-alumina, η-alumina, and θ-alumina, or a mixture thereof.

The above-mentioned substances are each capable of consuming hydrofluoric acid in the electrolytic solution by reacting with the hydrofluoric acid and water in the electrolytic solution to form a stable complex and neutralize the hydrofluoric acid. When such substance is added to the conductive assistant, the dissolution of an electrode constituent substance can be suppressed. For example, when aluminum oxide is used as the substance, the hydrofluoric acid in the electrolytic solution can be consumed through the formation of $AlF_3$ or $AlF_3 \cdot 3H_2O$.

The specific surface area of the substance that consumes hydrofluoric acid is preferably 10 $m^2/g$ or more and 300 $m^2/g$ or less. When the specific surface area is less than 10 $m^2/g$, there is a tendency that the particle diameter of the oxide is increased to decrease its reactivity to hydrofluoric acid. Meanwhile, when the specific surface area is more than 300 $m^2/g$, there is a tendency that the amount of a binder to be used in the production of an electrode is increased or an electrode density is not increased.

In addition, the particle diameter of the substance that consumes hydrofluoric acid is preferably 1 nm or more and 500 nm or less.

Now, an example of measurement results of the amount of metal elution from an electrode containing the substance that consumes hydrofluoric acid is described. However, the present invention is not limited to the substances described as examples, and any substance that consumes hydrofluoric acid in an electrolytic solution may be used without any limitation.

(Production Method for Working Electrode)

0.04 g of iron (a substance easily dissolving in hydrofluoric acid was selected), 0.16 g of γ-alumina (specific surface area: 100 $m^2/g$), 1.4 g of carbon black (manufactured by Timcal Graphite & Carbon, trade name: C45), and 0.4 g of PTFE were weighed out.

0.04 g of iron, 0.16 g of γ-alumina, and 1.4 g of carbon black weighed out were put into an agate mortar, and the powders were uniformly mixed using a pestle. 0.4 g of PTFE was further put into the agate mortar, and the contents were vigorously mixed so as to stretch the PTFE. Thus, a rubbery composite was obtained. A working electrode was produced by performing similar operations to those described above using the rubbery composite.

The electrochemical elution test described above was performed using the working electrode.

Metal elution amounts in the case where γ-alumina is added to the working electrode and in the case where γ-alumina is not added thereto are shown in Table 2. It is found that mixing of γ-alumina into the electrode has decreased the elution/precipitation amount of iron to ⅓.

TABLE 2

| Sample No. | Mass of iron contained in working electrode (g) | Mass of γ-alumina contained in working electrode (g) | Mass of metal precipitated on counter electrode/mass of metal contained in working electrode (mass %) |
|---|---|---|---|
| 10 | 0.04 | 0.16 | 9.5 |
| 5 | 0.04 | 0 | 29.5 |

The mass of the substance that consumes hydrofluoric acid is preferably set to 0.06 mass % or more and 0.3 mass % or less of the mass of the electrode. When the mass of the substance that consumes hydrofluoric acid is 0.06 mass % or more of the mass of the electrode, hydrofluoric acid removal performance becomes satisfactory. In addition, many of the substances that consume hydrofluoric acid are insulators, and hence when the mass is set to 0.3 mass % or less of the mass of the electrode, a decrease in battery performance due to an increase in resistance value can be prevented. The content of the substance that consumes hydrofluoric acid is preferably 2 mass % or more and 20 mass % or less, more preferably 5 mass % or more and 10 mass % or less with respect to the mass of the conductive assistant. When the content is 2 mass % or more, the hydrofluoric acid removal performance is satisfactory. In addition, the substance that consumes hydrofluoric acid is an insulator, and hence when its mass is set to 20 mass % or less, a decrease in battery performance due to an increase in resistance value can be prevented.

A positive electrode active material is constituted of a lithium ion or a transition metal ion, and a counter anion, such as oxygen. As the positive electrode active material, any one kind or two or more kinds appropriately selected from known materials may be used. Of those, a lithium-containing metal oxide is suitable. Examples of the lithium-containing metal oxide may include complex oxides each containing lithium and at least one kind of element selected from, for example, Co, Mg, Cr, Mn, Ni, Fe, Al, Mo, V, W, and Ti.

As a negative electrode active material, there may be used one kind or two or more kinds selected from hitherto known materials known as negative electrode active materials in lithium-based batteries (materials capable of occluding and releasing lithium ions). For example, as a material capable of occluding and releasing lithium ions, there may be used alone or as a composite, a carbon material, any one of Si and Sn, or an alloy or oxide containing at least one kind thereof, and the like. Typical examples of the carbon material may include: natural graphite; artificial graphite produced by subjecting petroleum-based and coal-based coke to heat treatment; hard carbon obtained by carbonizing a resin; and a mesophase pitch-based carbon material. When natural graphite or artificial graphite is used, from the viewpoint of an increase in battery capacity, graphite having a spacing d (002) of (002) planes of a graphite structure based on powder X-ray diffraction falling within the range of from 0.335 nm to 0.337 nm is preferred.

The d(002) can be measured in accordance with a known method by a powder X-ray diffraction (XRD) method (see Tokichi Noda, Michio Inagaki, Japan Society for the Promotion of Science, 117th committee document, 117-71-A-1 (1963), Michio Inagaki, et al., Japan Society for the Promotion of Science, 117th committee document, 117-121-C-5 (1972), and Michio Inagaki, "Carbon", 1963, No. 36, p. 25-34).

As a binder in an electrode forming material, there may be used one appropriately selected from materials hitherto known as binders for electrodes for lithium-based batteries. Preferred examples of such binder may include a fluorine-containing high molecular weight polymer, such as polyvinylidene fluoride, a vinylidene fluoride-hexafluoropropylene copolymer, a vinylidene fluoride-chlorotrifluoroethylene copolymer, or a vinylidene fluoride-tetrafluoroethylene copolymer, and a styrene-butadiene copolymer rubber.

An organic solvent that dissolves a supporting electrolyte is preferably an organic solvent, such as: an ether, such as diethyl ether, dibutyl ether, ethylene glycol dimethyl ether, ethylene glycol diethyl ether, ethylene glycol dibutyl ether, diethylene glycol dimethyl ether, diethylene glycol diethyl ether, diethylene glycol dibutyl ether, ethylene glycol diphenyl ether, 1,2-dimethoxyethane, or diethoxyethane; an amide, such as formamide, N-methylformamide, N,N-dimethylformamide, N-ethylformamide, N,N-diethylformamide, N-methylacetamide, N,N-dimethylacetamide, N-ethylacetamide, N,N-diethylacetamide, N,N-dimethylpropionamide, or hexamethylphosphorylamide; a sulfur-containing compound, such as dimethylsulfoxide or sulfolane; a dialkyl ketone, such as methyl ethyl ketone or methyl isobutyl ketone; a cyclic ether, such as ethylene oxide, propylene oxide, tetrahydrofuran, 2-methoxytetrahydrofuran, or 1,3-dioxolane; a carbonate, such as ethylene carbonate, butylene carbonate, diethyl carbonate, dimethyl carbonate, methyl ethyl carbonate, propylene carbonate, or vinylene carbonate; γ-butyrolactone; N-methylpyrrolidone; acetonitrile; or nitromethane.

More preferably, there are given carbonates, such as ethylene carbonate, butylene carbonate, diethyl carbonate, dimethyl carbonate, methyl ethyl carbonate, propylene carbonate, and vinylene carbonate, γ-butyrolactone, 1,3-dioxolane, diethyl ether, diethoxyethane, dimethylsulfoxide, acetonitrile, and tetrahydrofuran. A carbonate-based non-aqueous solvent, such as ethylene carbonate or propylene carbonate, may be particularly preferably used. One kind of those solvents may be used alone, or two or more kinds thereof may be used as a mixture.

As the supporting electrolyte, there may be used any one, or a mixture of two or more, of known fluorine-containing lithium salts, such as $LiPF_6$, $LiBF_4$, $LiSbF_6$, $LiTaF_6$, $LiNbF_6$, and $LiSO_3CF_4$.

The hydrofluoric acid-containing electrolytic solution means an electrolytic solution that is obtained by dissolving the supporting electrolyte in an organic solvent and that has a content of hydrofluoric acid of about 100 ppm by mass or less, preferably about 50 ppm by mass or less.

The conductive assistant according to one embodiment of the present invention can be particularly suitably used for an electrolytic solution containing hydrofluoric acid in the electrolytic solution. However, as a matter of course, the conductive assistant can also be used in an electrolytic solution free of hydrofluoric acid without any problem.

To the electrolytic solution, an additive agent, such as vinylene carbonate, ethylene sulfite, or fluoroethylene carbonate, may be appropriately added.

The additive agent forms a film on the surface of the negative electrode to suppress the reduction decomposition of the electrolytic solution.

As the form of a lithium secondary battery, there may be adopted a cylindrical battery using an exterior can or a soft package battery using a laminate film as an exterior body.

A battery module in which a plurality of such batteries are arranged may also be adopted.

In addition, electrode additives may be screened on the basis of the above-mentioned findings. Specifically, by adding each of various additives to an electrode, and analyzing the elution behavior of each of the additives in an electrolytic solution containing hydrofluoric acid, the additives can be easily classified into an additive that is poorly soluble in the hydrofluoric acid contained in the electrolytic solution and an additive that is soluble in the hydrofluoric acid contained in the electrolytic solution. Thus, an additive agent that can be added to an electrode in a secondary battery using an electrolytic solution containing hydrofluoric acid can be easily selected.

EXAMPLES

Now, the present invention is described in detail by way of Examples. However, the present invention is not limited by the following Examples.

<Conductive Assistant 1: Carbon Nanotubes 1>

80 g of methanol was put into a beaker, and 18.00 g of iron nitrate nonahydrate was dissolved therein. To the aqueous solution, 10.00 g of γ-alumina (specific surface area: 100 m²/g) was added, and the mixture was treated with an ultrasonic disperser for 5 minutes to prepare a catalyst dispersion liquid.

100 Balls made of α-alumina (diameter: 5 mm: hereinafter referred to as "alumina balls") (mass: 26.50 g) were put into a sieve made of stainless steel having an opening of 3.35 mm, and while the alumina balls were rolled, the catalyst dispersion liquid was added dropwise.

The whole amount of the alumina balls coated with the catalyst dispersion liquid was put into a quartz boat, and the quartz boat was placed at the center of a horizontal tubular furnace (inner diameter: 55 mm, soaking area: 300 mm). The temperature was increased under a nitrogen stream (2 NL/min.) to 500° C. in 30 minutes and kept at 500° C. for 30 minutes, followed by air-cooling to room temperature.

After the air-cooling, the mass of the alumina balls was measured to be 26.58 g (the total mass of the catalyst with which the 100 alumina balls were coated was 0.08 g).

Figure 4:
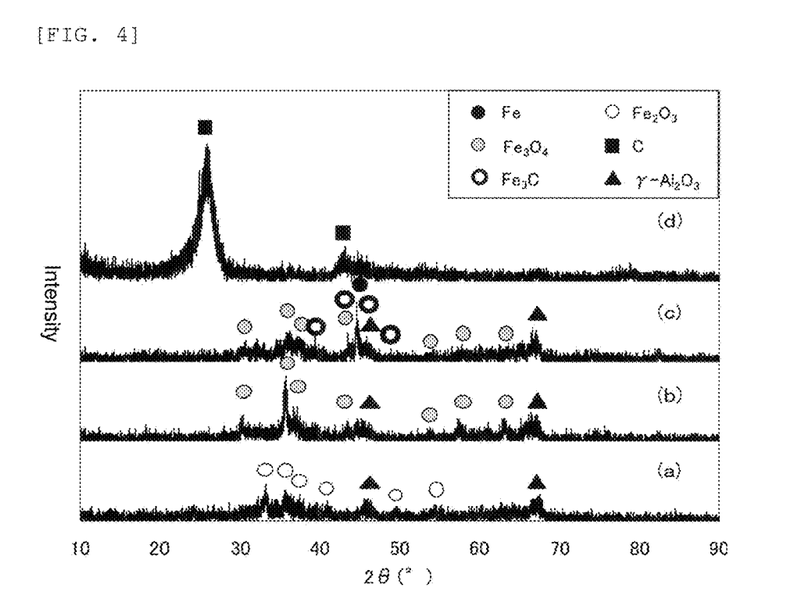
FIG. 4 is an example of X-ray diffraction patterns of a catalyst and products of Example 1.

An X-ray diffraction pattern of the heat-treated catalyst (scraped off from the alumina balls) is shown in (a) of FIG. 4. It is found that the catalyst is a mixture of γ-alumina and iron(III) oxide ($Fe_2O_3$).

26.58 g of the alumina balls coated with the catalyst subjected to the heat treatment were again placed at the center of a horizontal tubular furnace (inner diameter: 55 mm, soaking area: 300 mm). The temperature was increased under a nitrogen stream (2 NL/min.) to 680° C. in 60 minutes, the gas was changed from nitrogen to a mixed gas of ethylene (2 NL/min.) and hydrogen (2 NL/min.), and a reaction was performed for 15 minutes to provide carbon nanotubes 1. After the reaction, the mixed gas was changed again to nitrogen, followed by air-cooling to room temperature.

The mass of the product recovered from the reaction furnace was 27.94 g. The recovered product was put into a sieve made of stainless steel having an opening of 3.35 mm, and sieved several times to be separated into the alumina balls and the carbon nanotubes.

An X-ray diffraction pattern of the carbon nanotubes is shown in (d) of FIG. 4. X-ray diffraction was performed using a powder X-ray diffractometer Ultima IV manufactured by Rigaku Corporation (X-ray source: CuKα (40 kV-50 mA), scanning rate: 2°/min.). It is found that the carbon nanotubes contain carbon as a main component. However, in this case, it cannot be identified in what form the catalyst metal species remains.

It was investigated how the catalyst metal species changed to produce carbon through the use of products obtained by using the same catalyst and shortening the reaction time to 5 seconds and 15 seconds.

X-ray diffraction patterns of the products (scraped off from alumina balls) obtained in reaction times of 5 seconds and 15 seconds are shown in (b) and (c) of FIG. 4, respectively. In the initial stage of the reaction, iron(III) oxide ($Fe_2O_3$) is reduced to form iron(II,III) oxide ($Fe_3O_4$). After that, part of the iron(II,III) oxide ($Fe_3O_4$) is further reduced to produce iron (Fe), and, through a reaction with ethylene, triiron carbide ($Fe_3C$) is produced.

Figure 5:
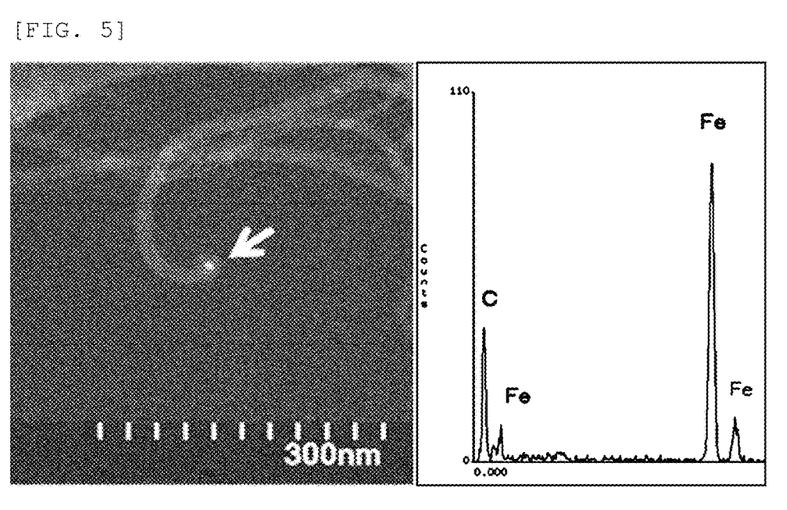
FIG. 5 is an example of a dark-field image of carbon nanotubes and energy dispersive X-ray analysis results.

After that, ethylene is decomposed by the catalyst reaction of iron to produce carbon and hydrogen. In this reaction, carbon grows from the surface of iron, and hence, as shown in FIG. 5, iron (Fe) is incorporated into the carbon. In addition, carbon and iron (Fe) are produced through the decomposition of iron carbide ($Fe_3C$), and also in this case, the iron is coated with carbon.

Therefore, it is considered that the catalyst metal species present outside the carbon are iron(II,III) oxide ($Fe_3O_4$) and iron carbide ($Fe_3C$).

The analysis results of the carbon nanotubes separated and recovered from the alumina balls with fluorescence X-rays (scanning X-ray fluorescence spectrometer ZSX PrimusII manufactured by Rigaku Corporation) were as follows: Fe (element): 1.023 mass %, and Al (element): 2.167 mass % (4.093 mass% in terms of alumina). The ratio of Fe (element) present outside the carbon nanotubes extracted with hydrochloric acid was 0.563 mass % of the total mass of the carbon nanotubes. Fe (element) present outside the carbon nanotubes is present as $Fe_3O_4$ and $Fe_3C$, which are poorly soluble in hydrofluoric acid.

(Extraction of Substance Present Outside Carbon Nanotubes with Hydrochloric Acid)

A metal present in carbon nanotubes cannot be brought into contact with an electrolytic solution, and hence is not eluted. A substance present outside the carbon nanotubes, which can be brought into contact with the electrolytic solution, may be extracted with hydrochloric acid (strong acid). A method for the extraction is described below.

0.1 g of carbon nanotubes are collected in a 50 mL glass vial, and 25 mL of hydrochloric acid (hydrochloric acid obtained by adding an equal volume of water to concentrated hydrochloric acid) is added with a pipette. The glass vial is loosely capped, and then heated on a hot plate at 90° C. After heating for 48 hours, the glass vial is cooled to room temperature. After the cooling, 0.1 mL of the metal-extracted liquid is sampled from the glass vial with a pipette and put into a 50 mL plastic container, and the volume of the contents is adjusted to 50 mL with ultrapure water.

Analysis is performed with an ICP emission spectrometer (Vista-PRO manufactured by SII NanoTechnology Inc.) to quantify each metal contained in the liquid.

<Conductive Assistant 2: Carbon Nanotubes 2>

80 g of methanol was put into a beaker, and 9.00 g of iron nitrate nonahydrate and 0.04 g of ammonium molybdate tetrahydrate were dissolved therein. To the aqueous solution, 11.25 g of γ-alumina (specific surface area: 100 m²/g) was added, and the mixture was treated with an ultrasonic disperser for 5 minutes to prepare a catalyst dispersion liquid.

100 balls made of α-alumina (diameter: 5 mm: hereinafter referred to as "alumina balls") (mass: 26.70 g) were put into a sieve made of stainless steel having an opening of 3.35 mm, and while the alumina balls were rolled, the catalyst dispersion liquid was added dropwise.

The whole amount of the alumina balls coated with the catalyst dispersion liquid was put into a quartz boat, and the quartz boat was placed at the center of a horizontal tubular furnace (inner diameter: 55 mm, soaking area: 300 mm). The temperature was increased under a nitrogen stream (2 NL/min.) to 500° C. in 30 minutes and kept at 500° C. for 30 minutes, followed by air-cooling to room temperature.

After the air-cooling, the mass of the alumina balls was measured to be 26.79 g (the total mass of the catalyst with which the 100 alumina balls were coated was 0.09 g).

26.79 g of the alumina balls coated with the catalyst subjected to the heat treatment were again placed at the center of a horizontal tubular furnace (inner diameter: 55 mm, soaking area: 300 mm). The temperature was increased under a nitrogen stream (2 NL/min.) to 680° C. in 60 minutes, the gas was changed from nitrogen to a mixed gas of ethylene (2 NL/min.) and hydrogen (2 NL/min.), and a reaction was performed for 15 minutes to provide carbon nanotubes 2. After the reaction, the mixed gas was changed again to nitrogen, followed by air-cooling to room temperature.

The mass of the product recovered from the reaction furnace was 28.05 g. The recovered product was put into a sieve made of stainless steel having an opening of 3.35 mm, and sieved several times to be separated into the alumina balls and the carbon nanotubes.

The presence form of molybdenum was investigated in the same manner as in the carbon nanotubes 1, and as a result, it was found that iron (metal) and molybdenum (metal) were incorporated into the inside of the carbon nanotubes, and iron(II,III) oxide ($Fe_3O_4$), iron carbide ($Fe_3C$), and molybdenum dioxide ($MoO_2$) remained outside the product.

The analysis results of the carbon nanotubes separated and recovered from the alumina balls with fluorescence X-rays (scanning X-ray fluorescence spectrometer ZSX PrimusII manufactured by Rigaku Corporation) were as follows: Fe (element): 0.638 mass %, Mo (element): 0.011 mass %, and Al (element): 3.038 mass % (5.739 mass % in terms of alumina). The ratios of Fe (element) and Mo (element) present outside the carbon nanotubes extracted with hydrochloric acid were 0.332 mass % and 0.006 mass % of the total mass of the carbon nanotubes, respectively.

<Preparation of Iron Particles>

200 g of iron nitrate nonahydrate was put into a beaker, and was dried using a vacuum dryer at 120° C. for 12 hours.

The whole amount of the dried product was ground using an agate mortar and a pestle.

The whole amount of the ground product was put into a quartz boat, and the quartz boat was placed in a horizontal tubular furnace (inner diameter: 55 mm, soaking area: 300 mm). The temperature was increased under a nitrogen stream (2 NL/min.) to 500° C. in 30 minutes and kept at 500° C. for 30 minutes, followed by air-cooling to room temperature.

10 g of $Fe_2O_3$ obtained by the heat treatment was put into a quartz boat, and the quartz boat was placed in a horizontal tubular furnace (inner diameter: 55 mm, soaking area: 300 mm). The temperature was increased under a nitrogen stream (2 NL/min.) to 680° C. in 60 minutes, the gas was changed from nitrogen to hydrogen (2 NL/min.), and reduction treatment was performed for 60 minutes. After the reduction treatment, the gas was changed again from hydrogen to nitrogen (2 NL/min.), followed by air-cooling to room temperature.

The resultant iron particles were sieved with a sieve made of stainless steel (opening: 20 μm) to prepare iron particles under the sieve.

Example 1

(Production Method for Positive Electrode)

190 g of a positive electrode active material NMC (Li($Ni_{1/3}Mn_{1/3}Co_{1/3}$)$O_2$), 4 g of the carbon nanotubes 1, and 6 g of polyvinylidene fluoride (PVdF) serving as a binder were weighed out, and were stirred and mixed in a planetary mixer while N-methyl-pyrrolidone was appropriately added, to produce a slurry dispersion liquid.

The produced dispersion liquid was applied onto an aluminum foil having a thickness of 20 μm with a roll coater, dried with a hot-air dryer, and then subjected to pressure molding with a roll press. The application amount and electrode density of the resultant positive electrode were 10 mg/cm² and 3.0 g/cm³, respectively.

The ratio of the mass of the metal contained in the transition metal compound that was poorly soluble in hydrofluoric acid in the positive electrode ($Fe_3O_4$ and $Fe_3C$ present outside the carbon nanotubes) was 0.0113 mass %, and the ratio of the mass of γ-alumina in the positive electrode was 0.0819 mass %.

(Production Method for Negative Electrode)

96 g of SCMG (trademark) manufactured by Showa Denko K.K., 1 g of carbon black, and 1.5 g of carboxymethyl cellulose (CMC) serving as a thickener were weighed out, and water was appropriately added to adjust the viscosity. 3.7 g of an aqueous solution having a solid content ratio of 40% and having dispersed therein styrene-butadiene rubber (SBR) fine particles was added, and the contents were stirred and mixed to produce a slurry dispersion liquid having sufficient fluidity. The produced dispersion liquid was applied onto a copper foil having a thickness of 20 μm using a doctor blade so as to have a uniform thickness of 150 μm, dried on a hot plate, and then dried with a vacuum dryer at 70° C. for 12 hours. The density of the dried electrode was adjusted with a roll press to provide a negative electrode for battery evaluation. The application amount and electrode density of the resultant electrode were 6 mg/cm² and 1.4 g/cm³, respectively.

(Production Method for Cell for Evaluation)

(Production of Li Ion Battery Test Cell (Laminate Cell))

A laminate cell was produced as described below. The following operation was performed under a dry argon atmosphere having a dew point of −80° C. or less.

The negative electrode and the positive electrode were punched into a negative electrode piece and a positive electrode piece each having an area of 20 cm². An Al tab and a Ni tab were attached to the Al foil of the positive electrode piece and the Cu foil of the negative electrode piece, respectively. A separator (microporous film made of polypropylene) was interposed between the negative electrode piece and the positive electrode piece to provide an electrode member in which both the tabs were drawn in nearly the same direction. Two rectangular aluminum laminate films each having an area larger than that of the plane of the electrode member were bonded to each other on one side, and the electrode member was sandwiched between the aluminum laminate films except for part of its tabs. Then, the aluminum laminate films were bonded by heat-sealing on other two sides except for the opposite side to the direction in which the tabs of the electrode member were drawn, and then the electrolytic solution was injected from the remaining open side (the above-mentioned opposite side). After that, the open side was sealed by heat-sealing. Thus, a battery for evaluation (design capacity: 25 mAh) was produced.

(Electrolytic Solution)

An electrolytic solution used was obtained by mixing ethylene carbonate and ethyl methyl carbonate at a volume ratio 3:7 as nonaqueous solvents, and dissolving $LiPF_6$ as an electrolyte salt therein at 1.0 mol/L.

(Rate Retention Rate)

The battery for evaluation was connected to a charge-discharge device (Aska Electronic Co., Ltd.), and was subjected to a test at an ambient temperature of 25° C. In a constant current (CC) and constant voltage (CV) mode with an upper limit voltage of 4.2 V, charge was performed at 5 mA with a cutoff current value of 1.25 mA.

As discharge, CC discharge was performed at current values equivalent to 0.2 C and equivalent to 10 C, and was cut-off at a voltage of 2.8 V.

A discharge capacity at 0.2 C was defined as 100, and a discharge capacity ratio at 10 C was evaluated as a rate retention rate.

(Cycle Test)

The battery for evaluation was connected to a charge-discharge device (Aska Electronic Co., Ltd.), and was subjected to a test at an ambient temperature 25° C. In a CC and CV mode with an upper limit voltage of 4.2 V, charge was performed at 25 mA (equivalent to 1 C) with a cutoff current value of 1.25 mA. In addition, in a CC mode with a lower limit voltage of 2.8 V, discharge was performed at 25 mA (equivalent to 1 C).

The charge-discharge operation under the above-mentioned conditions was defined as 1 cycle, and 500 cycles of charge-discharge were performed. A discharge capacity in the first cycle was defined as 100, and a discharge capacity ratio after the 500 cycles was evaluated as a cycle retention rate.

(Metal Elution Test)

After the cycle test, the cell in the discharged state was disassembled under a dry argon atmosphere having a dew point of −80° C. or less, and the negative electrode was washed with a solvent obtained by mixing ethylene carbonate and ethyl methyl carbonate at a volume ratio of 3:7, and was then dried to serve as an analysis sample.

The recovered negative electrode was put into a quartz beaker, and 1 mL of concentrated nitric acid was added with a pipette to dissolve the copper foil at ordinary temperature.

To the quartz beaker containing the sample, 2 mL of concentrated sulfuric acid was added with a pipette, and the quartz beaker was placed on a hot plate and heated at about 480° C. for 30 minutes. After the heating, the quartz beaker was cooled to room temperature. When a black spot (carbon) remained in the quartz beaker, the following operation was repeatedly performed until the black spot (carbon) disappeared. 1 mL of concentrated nitric acid was added with a pipette, the quartz beaker was placed on a hot plate again and heated at about 480° C. for 30 minutes, followed by cooling.

When any black spot was no longer able to be visually observed in the quartz beaker, the contents were washed into a 50 mL plastic container with ultrapure water, and the volume of the contents was adjusted to 50 mL with ultrapure water.

Analysis was performed with an ICP emission spectrometer (Vista-PRO manufactured by SII NanoTechnology Inc.) to quantify each metal contained in the liquid.

Metal elution ratio (ppm)=mass of metal precipitated on negative electrode (derived from conductive assistant)/mass of conductive assistant in positive electrode×1,000,000

Example 2

A cell was produced and evaluated in the same manner as in Example 1 except that the carbon nanotubes 1 added to the positive electrode of Example 1 were changed to the carbon nanotubes 2.

The mass of the metal contained in the transition metal compound that was poorly soluble in hydrofluoric acid in the positive electrode ($Fe_3O_4$ and $Fe_3C$ present outside the carbon nanotubes) was 0.0066 mass %, the mass of the metal contained in the substance including a transition metal that was not poorly soluble in hydrofluoric acid ($MoO_2$ present outside the carbon nanotubes) was 0.0001 mass %, and the mass of γ-alumina in the positive electrode was 0.1148 mass %.

Comparative Example 1

A cell was produced and evaluated in the same manner as in Example 1 except that the carbon nanotubes 1 added to the positive electrode of Example 1 were changed to a conductive assistant in which molybdenum dioxide (0.04 g) was added to the carbon nanotubes 1 (3.96 g).

The mass of the metal contained in the transition metal compound that was poorly soluble in hydrofluoric acid in the positive electrode ($Fe_3O_4$ and $Fe_3C$) was 0.0112 mass %, the mass of the metal contained in the substance including a transition metal that was soluble in hydrofluoric acid ($MoO_2$ present outside the carbon nanotubes) was 0.0150 mass %, and the mass of γ-alumina in the positive electrode was 0.0811 mass %.

Comparative Example 2 (Conductive Assistant 3: Carbon Black+Fe)

A cell was produced and evaluated in the same manner as in Example 1 except that the carbon nanotubes 1 added to the positive electrode of Example 1 were changed to a conductive assistant in which 0.04 g of iron particles were added to 3.96 g of carbon black (manufactured by Timcal Graphic & Carbon, trade name: C45).

The mass of the metal contained in the transition metal compound that was poorly soluble in hydrofluoric acid in the positive electrode ($Fe_3O_4$ and $Fe_3C$) was 0 mass %, the mass of the metal contained in the substance including a transition metal that was soluble in hydrofluoric acid (Fe present outside the carbon black) was 0.0200 mass %, and the mass of γ-alumina in the positive electrode was 0 mass %.

TABLE 3

| | Substance present outside conductive assistant | Rate retention rate | Cycle retention rate | Metal elution* (ppm) |
|---|---|---|---|---|
| Example 1 (Conductive assistant 1) | $Fe_3O_4$ $Fe_3C$ γ-Alumina | 57 | 90 | 15 |
| Example 2 (Conductive assistant 2) | $Fe_3O_4$ $Fe_3C$ $MoO_2$ γ-Alumina | 60 | 88 | 20 |
| Comparative Example 1 (Conductive assistant 1 + $MoO_2$) | $Fe_3O_4$ $Fe_3C$ $MoO_2$ γ-Alumina | 46 | 72 | 1,820 |
| Comparative Example 2 (Conductive assistant 3) | Fe | 38 | 56 | 4,200 |

*Metal elution: total metal elution amount derived from conductive assistant per weight of conductive assistant

The invention claimed is:

1. A lithium secondary battery, comprising:
   a hydrofluoric acid-containing electrolytic solution; and
   an electrode comprising an electrode active material and a conductive assistant containing a carbon material as a main component,
   in which the conductive assistant
   (1) contains substance A that is poorly soluble in the hydrofluoric acid-containing electrolytic solution, the substance A comprising one or more compounds selected from the group consisting of transition metal compounds, and
   (2) contains substance B that is soluble in the hydrofluoric acid-containing electrolytic solution, the substance B having a total metal mass of 0 mass % or more and 0.003 mass % or less with respect to a total mass of the electrode.

2. The lithium secondary battery according to claim 1, in which the substance A is at least one kind selected from the group consisting of iron (II) oxide, iron (III) oxide, and triiron carbide.

3. The lithium secondary battery according to claim 1, in which the conductive assistant contains a fibrous carbon material.

4. The lithium secondary battery according to claim 1, in which the conductive assistant further contains substance C that consumes hydrofluoric acid.

5. The lithium secondary battery according to claim 4, in which the substance C is a metal oxide.

6. The lithium secondary battery according to claim 4, in which the substance C is intermediate alumina.

7. The lithium secondary battery according to claim 4, in which the substance C has a mass of 0.06 mass % or more and 0.3 mass % or less of a total mass of the electrode.

8. The lithium secondary battery according to claim 1,
   in which the conductive assistant comprises metal-encapsulating carbon nanotubes, and
   in which the substance A is present outside the carbon nanotubes.

9. A lithium secondary battery, comprising:
   a hydrofluoric acid-containing electrolytic solution;
   an electrode comprising an electrode active material and a conductive assistant containing a carbon material as a main component,
   in which the conductive assistant
   (1) contains substance A that is poorly soluble in the hydrofluoric acid-containing electrolytic solution, the substance A comprising one or more compounds selected from the group consisting of transition metal compounds, and
   (2) is substantially free of substance B that is soluble in the hydrofluoric acid-containing electrolytic solution.

* * * * *